UNITED STATES PATENT OFFICE.

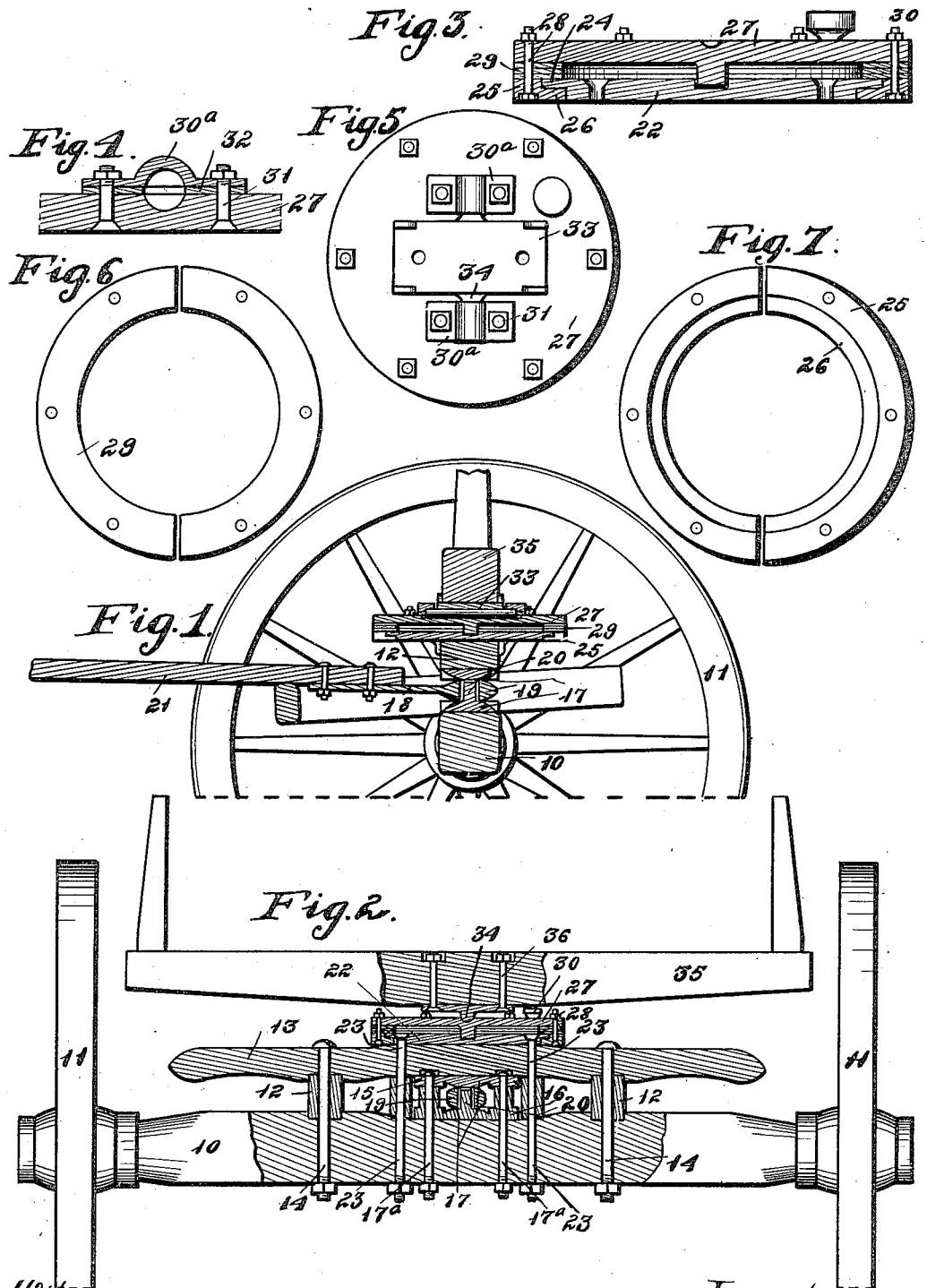

AUGUSTUS A. MERRILL, OF PIONEER, IOWA, ASSIGNOR OF ONE-HALF TO H. C. BARNES, OF ROLFE, IOWA.

VEHICLE RUNNING-GEAR.

981,583.  Specification of Letters Patent.  Patented Jan. 10, 1911.

Application filed July 13, 1910. Serial No. 571,863.

*To all whom it may concern:*

Be it known that I, AUGUSTUS A. MERRILL, a citizen of the United States, residing at Pioneer, in the county of Humboldt and State of Iowa, have invented a certain new and useful Vehicle Running-Gear, of which the following is a specification.

The object of my invention is to provide a vehicle running gear in which the forward bolster is mounted in such a manner that it may have a slight tilting movement from side to side and the turn table under the bolster is so arranged that it may move freely at all times so that the axle may be turned at an angle relative to the bolster and also to provide a turn table in which the parts may at all times be accurately fitted to avoid rattling and undue wear, and then after wear has taken place the parts may be readjusted to closely fit, and further to provide means whereby the parts of the turn table may be readily and easily detached for the purpose of repair or replacement.

A further object is to provide improved means for connecting the reach between the sand board and front axle so that the axle is permitted a limited movement relative to the reach in a direction with either end of the axle tilting upwardly or in a direction with the axle tilting forwardly or rearwardly relative to a vertical line and at the same time permitting the axle to have a pivotal movement relative to the reach.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a vertical, central, longitudinal, sectional view through the forward portion of a vehicle running gear embodying my invention. Fig. 2 shows a front elevation of a vehicle running gear embodying my invention, a portion of said view being shown in section to illustrate the details of construction. Fig. 3 shows an enlarged, detail, sectional view of the turn table. Fig. 4 shows an enlarged, detail, sectional view of the bearings for supporting the bolster plate. Fig. 5 shows a top or plan view of the bolster plate and the top of the turn table. Fig. 6 shows a plan view of one of the washers for the turn table, and Fig. 7 shows a plan view of the two-part bottom plate of the turn table.

Referring to the accompanying drawings, I have used the reference numeral 10 to indicate the front axle of a vehicle running gear having wheels 11 mounted thereon. Above the front axle are the hounds 12 and above the hounds is a sandboard 13, the axle, hounds and sandboard being firmly connected by bolts 14. All of these parts are of the ordinary construction now in general use.

I provide for connecting a reach with the front axle as follows: Mounted between the axle 10 and the sandboard 13 are two plates 15 and 16. These plates are held in position by means of bolts 17$^a$, which bolts extend through the front axle and both of the plates 15 and 16 as shown in Fig. 2. Each of said plates is provided at its central portion with a mounted or convex bearing surface 17 and between these bearing surfaces is a metal bar 18 having a head 19 which is made convex on both its upper and lower surfaces to fit against the convex bearing surfaces of said plates. An opening is provided through the center of the head 19 and a lug 20 formed on the lower plate is extended through said opening, said opening in the head 19 being somewhat larger than the lug to permit the front axle to tilt relative to the bar 18 to a limited extent. Fixed to the rear of the bar 18 is a reach 21 of ordinary construction. By means of this arrangement it is obvious that the front axle will have a pivotal movement relative to the reach and it is also obvious that the front axle may have either end tilt vertically to a limited extent or the axle may tilt forwardly and relative to a vertical line to a limited extent thus preventing binding movements of the head 19 relative to the rounded bearing surfaces 17 of the plates 15 and 16. It is to be understood in this connection that the tilting movements just described are ordinarily very slight and yet unless some play is provided these slight tilting movements will tend to wear out the lug 20. By my improved construction wear upon said lug is prevented and the parts may be used for a comparatively long time without repair or replacement.

Between the sandboard and the bolster it is necessary to provide a turn table so that the axle may turn relative to the wagon body. My improved turn table device comprises a stationary base plate 22 secured to the sandboard by means of bolts 23, said bolts also extending through the axles. The periphery of this plate is provided with an outwardly extended annular shoulder 24 as clearly shown in Fig. 3. Rotatably mounted relative to this stationary plate 23 is a rotatable base plate 25 having an annular flange or rib 26 extended under the flange 24. This rotatable plate 25 is preferably made in two parts as clearly shown in Fig. 7 so that either half of the plate may be detached without disturbing the other. The rotatable turn table member also comprises a top plate 27 connected with the rotatable bottom plate 25 by means of bolts 28. Between the plates 25 and 27 is a series of thin metal shoulders 29, each of which is divided transversely into two parts as clearly shown in Fig. 6. The bolts 28 are extended through these shoulders.

In order to provide for lubricating the joint between the stationary base plate 22 and the rotatable members of the turn table I provide an oil cup 30 of ordinary construction in the top plate 27 to discharge oil to the space between the top plate 27 and the stationary base plate 22. By means of this arrangement a turn table is provided in which there is a minimum of lost motion and hence there will be no rattling or noise; and further, the working parts of the turn table will be protected from dust and mud so that the parts will work freely relative to each other and by providing an oil cup these parts may be constantly lubricated to turn easily.

In the event that excessive wear has taken place between the working parts the operator need only remove the bolts 28, whereupon one or more of the washers may be detached to thereby permit a readjustment of the parts to make them fit snugly to each other.

On top of the plate 27 of the turn table are two bearings 30ª. Each of these bearings is held to the plate by means of bolts 31, as shown in Fig. 4, and between the bearings and the plate 27 is a washer 32 which may be removed to permit readjustment of the bearings. Between the bearings 30ª is a bolster plate 33 having journals 34 fixed to it and extended into the bearings 30ª. These journals are so arranged, as clearly shown in Fig. 2, that the ends of the bolster plate may tilt slightly relative to the top plate 27 of the turn table, this tilting movement however being limited from the ends of the bolster plate to strike upon the plate 27. This bolster plate is secured to the bolster 35 by means of the bolts 36.

In practical use it is obvious that the connection between the reach and the front axle is such that a limited tilting movement will be permitted for the front axle and the front axle may freely rotate relative to the reach thus preventing binding strains upon the reach. The bolster is securely connected to the front axle and yet it is permitted to have a slight tilting movement and also a rotary movement relative to the front axle. In the event that wear should take place the washers between the members of the turn table can be removed to provide for readjustment and at all times the turn table has its parts snugly fitted together in such a manner as to avoid rattling and undue wear and the turn table is protected from dust and mud and it is so arranged that it may be thoroughly lubricated at all times.

I claim as my invention:

1. In a vehicle running gear, the combination of an axle, a sandboard above the axle and connected with it, plates fitted to the adjacent surfaces of the sandboard and axle, and having convex central portions, a reach having a head on one end provided with convex upper and lower surfaces and fitted between the convex surfaces of said plates, and a lug for pivotally connecting said head between said plates.

2. A vehicle running gear, comprising an axle, a sandboard, hounds between the axle and sandboard, bolts connecting the sandboard, the hounds and the axle, two plates fitted to the adjacent surfaces of the sandboard and axle, said plates being provided at their central portions with convex bearing surfaces, a reach, a head on the reach having convex upper and lower surfaces in engagement with the convex bearing surfaces of said plates, bolts for connecting said plates with the axle, and a lug formed on the lower one of said plates and extending through said head on the reach, the opening in the reach to receive said bolt being larger than the bolt to permit tilting movements of the front axle relative to the reach, for the purposes stated.

3. In a vehicle running gear, the combination of an axle, a sandboard connected with the axle, a stationary turn-table plate connected with the sandboard, a rotary turn-table member rotatably mounted on the stationary one, a bolster connected with the rotary turn-table plate, hounds between the axle and the sandboard, bolts connecting the sandboard, the hounds and the axle, two plates fitted to the adjacent surfaces of the sandboard and axle, said plates being provided at their central portions with convex bearing surfaces, a reach, a head on the reach having convex upper and lower surfaces in engagement with the convex bearing surfaces of said plates, bolts for connecting said plates with the axle, and a lug formed on the lower one of said plates and extending through said head on the reach, substantially as described, and for the purposes stated.

4. In a vehicle running gear, the combination of an axle, a sandboard connected with the axle, hounds between the sandboard and axle, a stationary turn-table plate mounted on the axle, a rotary turn-table plate mounted on the stationary one, a bolster, a plate upon which said bolster is mounted, said plate being designed to be pivotally mounted in bearings on the rotary turn-table plate to allow a slight tilting movement of the bolster, two plates fitted to the adjacent surfaces of the sandboard and axle, said plates being provided at their central portions with convex bearing surfaces, a reach, a head on the reach having convex upper and lower surfaces in engagement with the convex bearing surfaces of said plates, bolts for connecting said plates with the axle, and a lug formed on the lower plate and extending through the head on the reach, substantially as described and for the purposes stated.

Des Moines, Iowa, June 30, 1910.

AUGUSTUS A. MERRILL.

Witnesses:
 OLIVER NEWTON,
 L. E. DOLDER.